(12) United States Patent
Ratasuk et al.

(10) Patent No.: US 10,003,445 B2
(45) Date of Patent: Jun. 19, 2018

(54) METHOD AND APPARATUS FOR SCHEDULING A CONTROLCHANNEL IN AN ORTHOGONAL FREQUENCY DIVISION MULTIPLEXING COMMUNICATION SYSTEM

(75) Inventors: Rapeepat Ratasuk, Hoffman Estates, IL (US); Jiangnan Jason Chen, Hawthorn Woods, IL (US); Li-Fan Zhang, Hangzhou (CN)

(73) Assignee: Google Technology Holdings LLC, Mountain View, CA (US)

( * ) Notice: Subject to any disclaimer, the term of this patent is extended or adjusted under 35 U.S.C. 154(b) by 1454 days.

(21) Appl. No.: 12/770,998

(22) Filed: Apr. 30, 2010

(65) Prior Publication Data

US 2011/0267967 A1 Nov. 3, 2011

(51) Int. Cl.
*H04L 5/00* (2006.01)

(52) U.S. Cl.
CPC ................................. *H04L 5/0053* (2013.01)

(58) Field of Classification Search
None
See application file for complete search history.

(56) References Cited

U.S. PATENT DOCUMENTS

2008/0301536 A1 12/2008 Shin et al.
2009/0262854 A1 10/2009 Lee et al.

FOREIGN PATENT DOCUMENTS

| WO | 2009037328 A2 | 3/2009 |
|---|---|---|
| WO | 2009041879 A1 | 4/2009 |
| WO | 2009056943 A2 | 5/2009 |
| WO | 2009087742 A1 | 7/2009 |

OTHER PUBLICATIONS

Panasonic: "Semi-static, dynamic and hybrid CCE aggregation", 3GPP Draft; RI-074908, 3rd Generation Partnership Project (3GPP), Mobile Competence Centre , 650, Route Des Lucioles , F-06921 Sophia-Antipolis Cedex, France, vol. RAN WGI, No. Korea; Oct. 30, 2007, Oct. 30, 2007 (Oct. 30, 2007) , XP050108363, all pages.

(Continued)

*Primary Examiner* — John Blanton
*Assistant Examiner* — Alan Lindenbaum
(74) *Attorney, Agent, or Firm* — Faegre Baker Daniels LLP

(57) ABSTRACT

A scheduler capable of operating in an Orthogonal Frequency Division Multiplexing communication system schedules a control channel for a user equipment by determining a channel quality metric associated with the user equipment, calculating a target control channel element quality metric, determining a control channel element utilization rate, wherein the control channel element utilization rate a past rate of utilization of control channel elements, and selecting a control channel element aggregation level for the control channel based on the channel quality metric, the target control channel element quality metric, and the control channel element utilization rate. The scheduler then allocates control channel elements to the control channel based on the selected control channel element aggregation level. The scheduler further may steal power from one or more unused control channel elements and assign the stolen power to control channel elements assigned to the control channel.

18 Claims, 6 Drawing Sheets

200

(56) References Cited

OTHER PUBLICATIONS

Panasonic: "Implicit assignment of PHICH", 3GPP Draft; RI-074913, 3rd Generation Partnership Project (3GPP), Mobile Competence Centre ; 650, Route Des Lucioles ; F-06921 Sophia-Antipolis Cedex; France, vol. RAN WGI, No. Korea; Oct. 30, 2007, Oct. 30, 2007 (Oct. 30, 2007), XP050108368, all pages.

Texas Instruments: "Multiplexing PDCCH Grants in E-UTRA Downlink", 3GPP Draft; RI-071490 PDCCH Map, 3rd Generation Partnership Project (3GPP), Mobile Competence Centre ; 650, Route Des Lucioles ; F-06921 Sophia-Antipolis Cedex; France, vol. RAN WGI, No. St. Julian; Apr. 3, 2007, Apr. 3, 2007 (Apr. 3, 2007), XP050105423, all pages.

Patent Cooperation Treaty, International Search Report and Written Opinion of the International Searching Authority for International Application No. PCT/US2011/032845, dated Aug. 3, 2011, 16 pages.

FIG. 1 -PRIOR ART-

| CQI (dB) | Mod | Code Rate | Rep rate |
|---|---|---|---|
| -10 | QPSK | 1/2 | 6 |
| -9 | QPSK | 1/2 | 6 |
| -8 | QPSK | 1/2 | 6 |
| -7 | QPSK | 1/2 | 6 |
| -6 | QPSK | 1/2 | 6 |
| -5 | QPSK | 1/2 | 6 |
| -4 | QPSK | 1/2 | 6 |
| -3 | QPSK | 1/2 | 6 |
| -2 | QPSK | 1/2 | 6 |
| -1 | QPSK | 1/2 | 6 |
| 0 | QPSK | 1/2 | 6 |
| 1 | QPSK | 1/2 | 4 |
| 2 | QPSK | 1/2 | 4 |
| 3 | QPSK | 1/2 | 4 |
| 4 | QPSK | 1/2 | 2 |
| 5 | QPSK | 1/2 | 2 |
| 6 | QPSK | 1/2 | 2 |
| 7 | QPSK | 1/2 | 2 |
| 8 | QPSK | 1/2 | 2 |
| 9 | QPSK | 1/2 | 1 |
| 10 | QPSK | 1/2 | 1 |
| 11 | QPSK | 1/2 | 1 |
| 12 | QPSK | 3/4 | 1 |
| 13 | QPSK | 3/4 | 1 |
| 14 | 16-QAM | 1/2 | 1 |
| 15 | 16-QAM | 1/2 | 1 |
| 16 | 16-QAM | 1/2 | 1 |
| 17 | 16-QAM | 1/2 | 1 |
| 18 | 16-QAM | 1/2 | 1 |
| 19 | 16-QAM | 3/4 | 1 |
| 20 | 16-QAM | 3/4 | 1 |
| 21 | 16-QAM | 3/4 | 1 |
| 22 | 16-QAM | 3/4 | 1 |
| 23 | 64-QAM | 2/3 | 1 |
| 24 | 64-QAM | 2/3 | 1 |
| 25 | 64-QAM | 2/3 | 1 |
| 26 | 64-QAM | 3/4 | 1 |
| 27 | 64-QAM | 3/4 | 1 |
| 28 | 64-QAM | 5/6 | 1 |
| 29 | 64-QAM | 5/6 | 1 |
| 30 | 64-QAM | 5/6 | 1 |
| 31 | 64-QAM | 5/6 | 1 |

METHOD AND APPARATUS FOR SCHEDULING A CONTROLCHANNEL IN AN ORTHOGONAL FREQUENCY DIVISION MULTIPLEXING COMMUNICATION SYSTEM

FIELD OF THE INVENTION

The present invention relates generally to Orthogonal Frequency Division Multiplexing (OFDM) communication systems, and, in particular, to a scheduling of control channels in an OFDM communication system.

BACKGROUND OF THE INVENTION

The Third Generation Partnership Project (3GPP) Long Term Evolution (LTE) standards propose using an Orthogonal Frequency Division Multiple Access (OFDMA) for transmission of data over an air interface. In an OFDMA communication system, a frequency channel, or bandwidth, is split into multiple channel elements during a given time period. In the control channel, each control channel element comprises 36 orthogonal frequency sub-carriers over a given number of OFDM symbols, which are the physical layer channels over which channels are transmitted in a TDM or TDM/FDM fashion. In the physical domain, the control channel elements are distributed throughout the bandwidth. A control channel then comprises one or more channel elements (that is, control channel elements (CCEs)) that are distributed across the entire bandwidth, which CCEs are logically contiguous but physically diverse. That is, control signaling, such as downlink (DL) and uplink (UL) grants and power control signaling, are transmitted using a Physical Downlink Control Channel (PDCCH) that, in turn, consists of 1, 2, 4, or 8 logically contiguous, but physically diverse, CCEs.

Typically, the number of CCEs allocated to the PDCCH for a given user/user equipment (UE) is determined by reference to a lookup table and based on Channel Quality Information (CQI) reported by the UE. The worse the reported channel conditions, the greater the number of CCEs allocated to the UE. For example, when a CQI value of 15, corresponding to good channel conditions, is reported by a UE then a single CCE may be allocated to the UE for a DL and/or an UL grant, and when a CQI value of 2, corresponding to poor channel conditions, is reported by a UE then eight CCEs may be allocated to the UE for a DL and/or an UL grant.

In addition, the 3GPP LTE standards provide for limiting the range of CCEs that may be allocated to a particular UE for a PDCCH in order to minimize a search by a UE for its allocated PDCCH. That is, a UE does not know in advance where, among all possible CCEs of a sub-frame, to find its allocated PDCCH. In order to limit a maximum number of blind decodes performed by a UE in order to determine whether a PDCCH has been allocated to the UE, common and UE-specific CCE search spaces are pre-defined by an algorithm maintained by each UE.

For example and referring now to FIG. 1, a block diagram 100 is provided that illustrates an exemplary allocation of search spaces and logical CCEs of a sub-frame to users' equipment (UEs) served by an eNodeB in accordance with the prior art. A first group of logical CCEs 0-15 are a common search space in which any UE served by the eNodeB may be allocated a PDCCH, with the result that all UEs served by the eNodeB will search this space for their PDCCH and corresponding DL/UL grant. A second group of CCEs 16-43 are a UE-specific search space in which only a subset of all UEs served by the eNode B, for example, UEs 101-104, may be allocated a PDCCH, with the result that only that subset of UEs will search this space for their PDCCH and corresponding DL/UL grant. As a result, all UEs served by the eNodeB will search CCEs 0-15 to determine whether they have been allocated a PDCCH and granted a DL or UL, whereas only the subset of UEs, that is, UEs 101-104, will also search CCEs 16-43 to determine whether they have been allocated a PDCCH and granted a DL or UL.

Due to the use of the UE-specific search spaces, some users/UEs may be blocked from allocation of a CCE, and correspondingly cannot be scheduled for a DL or UL transmission even though CCEs are available. For example and again referring to FIG. 1, based on CQI feedback, the serving eNodeB has granted a DL and/or UL channel to each of UEs 101 and 104 and has allocated four consecutive logical CCEs, that is, CCEs 16-19 and 23-26, to a control channel, that is, a PDCCH, for transmission of the grants to UEs 101 and 104, respectively. The serving eNodeB also has granted a DL and/or UL channel to UEs 103 and has allocated two consecutive logical CCEs 42-43 to a PDCCH for transmission of the grant to UE 103. Typically, UE 103 is allocated fewer CCEs than UEs 101 and 104 because channel conditions are better between the eNodeB and UE 103 than between the eNodeB and UEs 101 and 104, and correspondingly the control channel between the eNodeB and UE 103 will utilize a higher level modulation scheme, a lower coding rate, and/or a lower bit repetition rate than the control channels between the eNodeB and UEs 10 and 104, and therefore needs fewer CCEs. However, UE 102 is blocked from a CCE allocation and therefore cannot be scheduled for a control channel transmission, and correspondingly cannot be granted a DL or UL channel, even though logical CCEs 20-22 and 27 are available.

The blocking of UEs from being scheduled for a control channel, with the result that those UEs cannot be granted a DL or UL channel, even though logical CCEs are available for assignment to those UEs results in a longer latency for data transfers to and from the blocked UEs, a lower system throughput, and a waste of system capacity. As a result, a need exists for an improved method and apparatus for scheduling a control channel for a UE in a 3GPP LTE communication system.

BRIEF DESCRIPTION OF THE DRAWINGS

FIG. 7 is an exemplary table of Channel Quality Information (CQI) values that may be reported by a user equipment and the corresponding modulation schemes and coding rates that may be mapped to those values.

Figure 1:
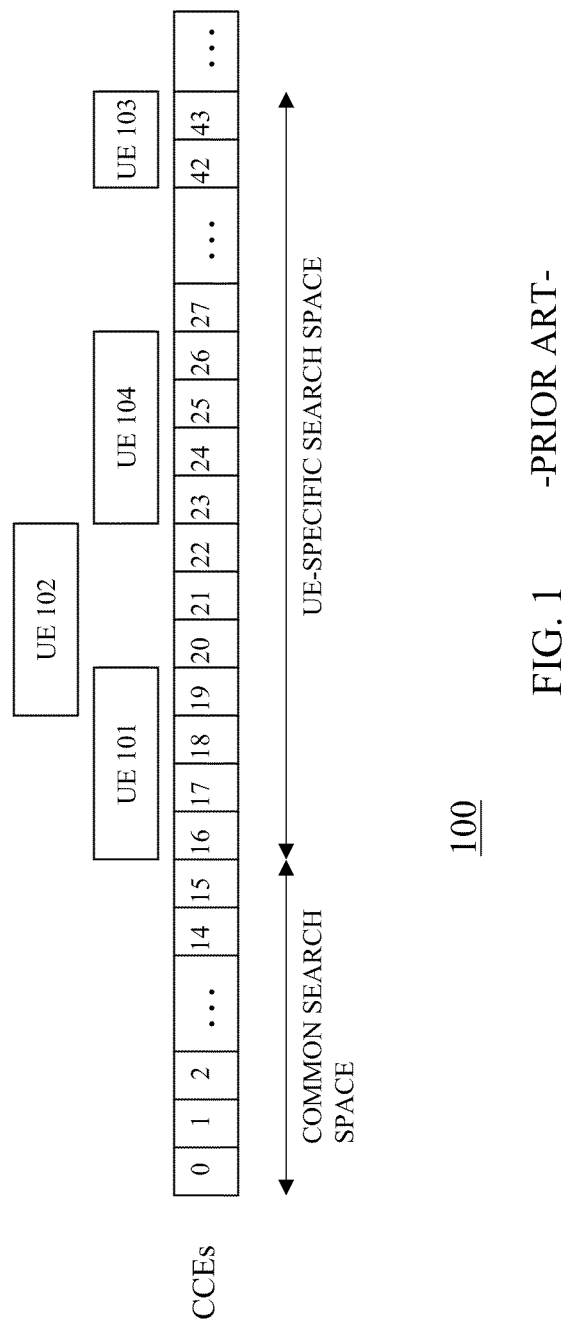
FIG. 1 is a block diagram illustrating an exemplary allocation of logical Control Channel Elements (CCEs) to users' equipment (UEs) served by an eNodeB in accordance with the prior art.

One of ordinary skill in the art will appreciate that elements in the figures are illustrated for simplicity and clarity and have not necessarily been drawn to scale. For example, the dimensions of some of the elements in the figures may be exaggerated relative to other elements to help improve understanding of various embodiments of the present invention. Also, common and well-understood elements that are useful or necessary in a commercially feasible embodiment are often not depicted in order to facilitate a less obstructed view of these various embodiments of the present invention.

DETAILED DESCRIPTION OF THE INVENTION

To address the need for an improved method and apparatus for scheduling a control channel for a UE in a 3GPP LTE communication system, a scheduler is provided that is capable of operating in an Orthogonal Frequency Division Multiplexing (OFDM) communication system and that schedules a control channel for a user equipment (UE) by determining a channel quality metric associated with the UE, calculating a target control channel element quality metric, determining a control channel element utilization rate, wherein the control channel element utilization rate a past rate of utilization of control channel elements, and selecting a control channel element aggregation level for the control channel based on the channel quality metric, the target control channel element quality metric, and the control channel element utilization rate. The scheduler then allocates control channel elements to the control channel based on the selected control channel element aggregation level. The scheduler further may steal power from one or more unused control channel elements and assign the stolen power to control channel elements assigned to the control channel.

Generally, an embodiment of the present invention encompasses a method for scheduling a control channel for a user equipment (UE) in an OFDM communication system. The method includes determining a channel quality metric associated with the UE, calculating a target control channel element quality metric, determining a control channel element utilization rate, wherein the control channel element utilization rate corresponds to a past rate of utilization of control channel elements, and selecting a control channel element aggregation level for the control channel based on the channel quality metric, the target control channel element quality metric, and the control channel element utilization rate.

Another embodiment of the present invention encompasses a method for determining a control channel element utilization rate in an OFDM communication system, the method comprising calculating one or more of a number of control channel elements and a percentage of control channel elements allocated to control channels in each of one or more past scheduling periods.

Yet another embodiment of the present invention encompasses a scheduler for scheduling a control channel for a UE in an OFDM communication system, the scheduler comprising a processor that is configured to determine a channel quality metric associated with the UE, calculate a target control channel element quality metric, determine a control channel element utilization rate, wherein the control channel element utilization rate corresponds to a past rate of utilization of control channel elements, and select a control channel element aggregation level for the control channel based on the channel quality metric, the target control channel element quality metric, and the control channel element utilization rate.

Figure 2:
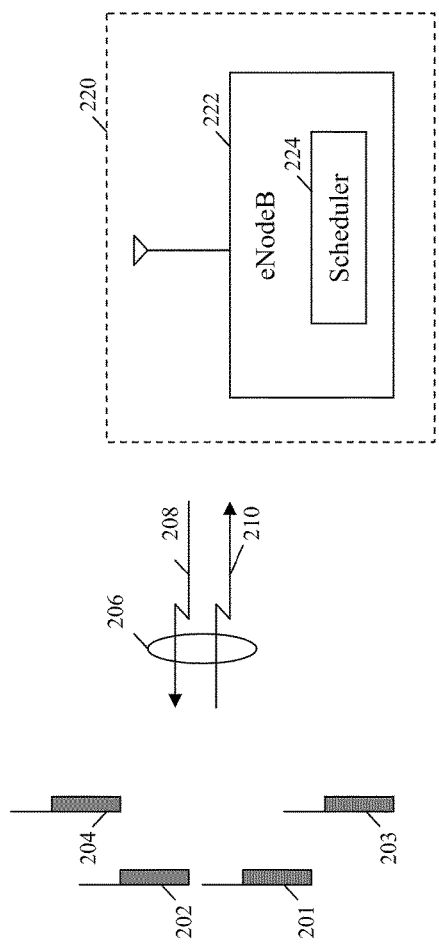
FIG. 2 is a block diagram of a wireless communication system in accordance with an embodiment of the present invention.

The present invention may be more fully described with reference to FIGS. 2-8. FIG. 2 is a block diagram of a wireless communication system 200 in accordance with an embodiment of the present invention. Communication system 200 includes multiple users' equipment (UEs) 201-204 (four shown), such as but not limited to a cellular telephone, a radio telephone, a personal digital assistant (PDA) with radio frequency (RF) capabilities, or a wireless modem that provides RF access to digital terminal equipment (DTE) such as a laptop computer. In various technologies, UEs 201-204 may be referred to as a mobile station (MS), a subscriber unit (SU), an access terminal (AT), and so on. Communication system 200 further includes a Radio Access Network (RAN) 220 that provides communication services to UEs 201-204 via an air interface 206. Air interface 206 comprises a downlink (DL) 208 and an uplink (UL) 210. Each of DL 208 and UL 210 comprises multiple physical communication channels, including multiple control channels, including pilot channels, and multiple traffic channels.

RAN 220 includes an access network node 222, such as but not limited to an eNodeB, a Node B, or a Base Station (BS) (collectively referred to herein as an "eNodeB"), that provides wireless communication services to the multiple UEs 201-204. NodeB 222 includes a scheduler 224 that performs the scheduling functions described herein as being performed by the RAN, such as scheduling DL and UL transmissions for UEs serviced by the RAN, such as UEs 201-204.

Figure 4:
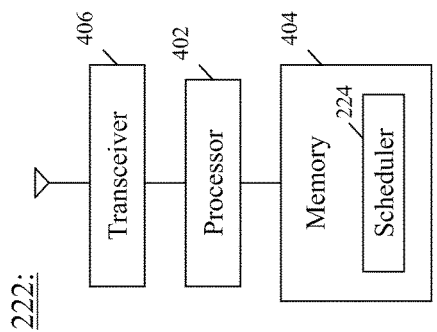
FIG. 4 is a block diagram of an eNodeB in accordance with an embodiment of the present invention.
Figure 3:
FIG. 3 is a block diagram of a user equipment in accordance with an embodiment of the present invention.

Referring now to FIGS. 3 and 4, block diagrams respectively are provided of a user equipment (UE) 300, such as UEs 201-204, and eNodeB 222 in accordance with an embodiment of the present invention. Each of UE 300 and eNodeB 222 includes a respective processor 302, 402, such as one or more microprocessors, microcontrollers, digital signal processors (DSPs), combinations thereof or such other devices known to those having ordinary skill in the art. The particular operations/functions of processors 302, 402 and respectively thus of UE 300 and eNodeB 222, are determined by an execution of software instructions and routines that are stored in a respective at least one memory device 304, 404 associated with the processor, such as random access memory (RAM), dynamic random access memory (DRAM), and/or read only memory (ROM) or equivalents thereof, that store data and programs that may be executed by the corresponding processor. Each of UE 300 and eNodeB 222 further includes a respective transceiver 306, 406 that is coupled to a respective processor 302, 402 and that includes a radio frequency (RF) receiver and an RF transmitter for wirelessly communicating with the multiple UEs 201-204 serviced by the eNodeB.

Scheduler 224 is implemented by processor 402 of eNodeB 222 based on data and software maintained in the at least one memory device 404 of the eNodeB. However, in other embodiments of the present invention, scheduler 224 may be included in a network element separate from, and coupled to, the eNodeB and comprising its own processor and at least one memory device.

The embodiments of the present invention preferably are implemented within UEs 201-204 and eNodeB 222 and more particularly with or in software programs and instructions stored in the respective at least one memory devices 304, 404 and executed by respective processors 302, 402. However, one of ordinary skill in the art realizes that the embodiments of the present invention alternatively may be implemented in hardware, for example, integrated circuits (ICs), application specific integrated circuits (ASICs), and the like, such as ASICs implemented in one or more of UEs 201-204 and NodeB 222. Based on the present disclosure, one skilled in the art will be readily capable of producing and implementing such software and/or hardware without undo experimentation. Furthermore, unless otherwise specified herein, the functions described herein as being performed by eNode B 222 are performed by scheduler 224, and more particularly by a processor associated with the scheduler, such as processor 402 of eNodeB 222, based on programs and instructions stored in an at least one memory device, that is, at least one memory device 404, associated with the scheduler.

Figure 5:
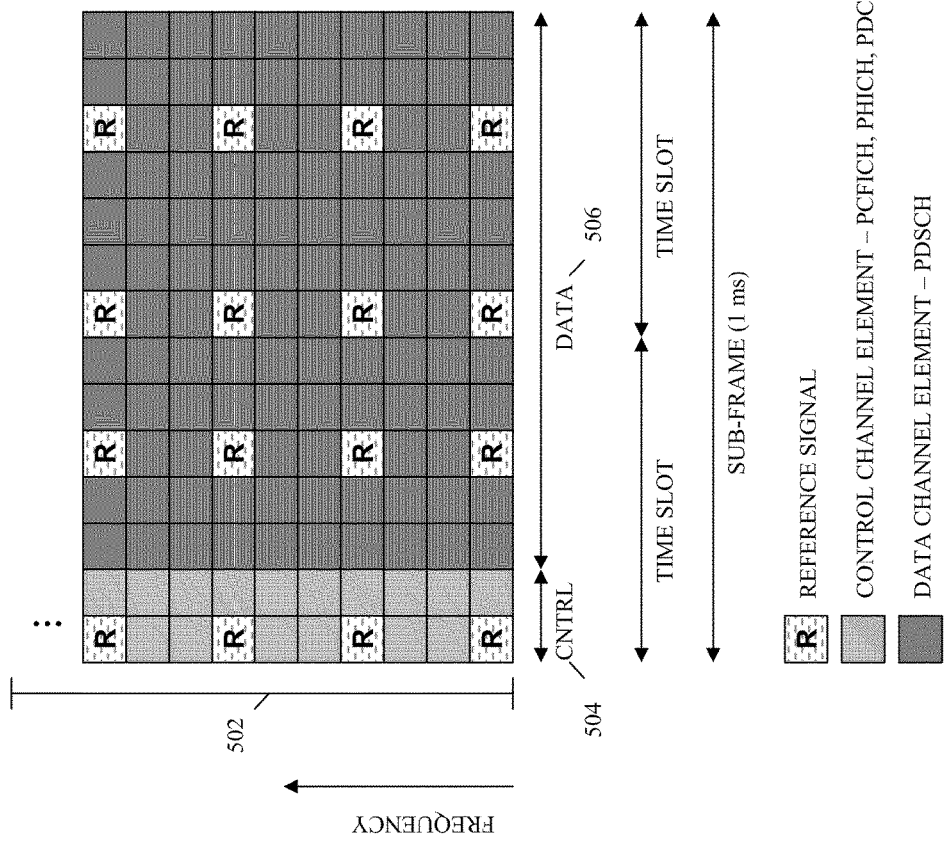
FIG. 5 is an exemplary time-frequency diagram of an OFDMA frequency bandwidth that may be employed by an OFDM communication system.

Communication system 200 comprises an Orthogonal Frequency Division Multiple Access (OFDMA) modulation scheme for transmitting data over air interface 206, wherein a frequency channel, or bandwidth, is split into multiple frequency channel elements during a given time period. For example, FIG. 5 depicts an exemplary time-frequency diagram 500 of an OFDMA frequency bandwidth 502 that may be employed by an OFDM communication system, which time-frequency diagram is provided for the purpose of illustrating the principles of the present invention and is not intended to limit the invention in any way. A vertical scale of time-frequency diagram 500 depicts multiple blocks of frequency (frequency subcarriers) of the frequency bandwidth that may be allocated by an eNodeB, and in particular by an associated scheduler, and a horizontal scale of time-frequency diagram 500 depicts multiple blocks of time (in units of OFDM symbols) of a sub-frame that may be allocated. A control section 504 of time-frequency diagram 500 comprises channel elements that may be allocated to control channels, such as a Physical Control Format Indicator Channel (PCFICH), a Physical Hybrid ARQ Indicator Channel (PHICH), and a Physical Downlink Control Channel (PDCCH), and a data section 506 comprises channel elements that may be allocated to data channels, such as a Physical Downlink Shared Channel (PDSCH). Each channel element comprises multiple, for example, 36 in 3GPP LTE, orthogonal frequency sub-carriers over a given number of OFDM symbols, that are the physical layer channels over which traffic and signaling channels are transmitted in a TDM or TDM/FDM fashion. In other technologies, channel elements may be referred to as resource elements or in various other ways that refer to the concept of assignable blocks of sub-carriers over a given number of OFDM symbols, and all references herein to channel elements are intended to include such other terminologies and concepts. A UE then is assigned a control channel comprising one or more channel elements, that is, control channel elements (CCEs), for an exchange of control information, thereby permitting multiple UEs to simultaneously receive control information on the different CCEs.

In addition, communication system 200 preferably operates according to the Third Generation Partnership Project Long Term Evolution (3GPP LTE) standards, which standards specify wireless telecommunications system operating protocols, including radio system parameters and call processing procedures. In a 3GPP LTE communication system, a Physical Downlink Control Channel (PDCCH) may comprise 1, 2, 4, or 8 CCEs, hereinafter also referred to as CCE aggregation levels. That is, in a 3GPP LTE communication system, a PDCCH has four CCE aggregation levels that respectively comprise aggregating 1, 2, 4, or 8 CCEs together to form the PDCCH. However, those who are of ordinary skill in the art realize that communication system 200 may operate in accordance with any wireless telecommunication standard employing an Orthogonal Frequency Division Multiplexing (OFDM) modulation scheme and that aggregates blocks of OFDM resources, such as resource elements and/or other combinations of sub-channels over a given time interval, to create a control channel. For example, in other embodiments of the present invention communication system 200 may be a 3GPP2 (Third Generation Partnership Project 2) Evolution communication system, for example, a CDMA (Code Division Multiple Access) 2000 1xEV-DV communication system, a Wireless Local Area Network (WLAN) communication system as described by the IEEE 802.xx standards, for example, the 802.11a/HiperLAN2, 802.11g, or 802.20 standards, or a Worldwide Interoperability for Microwave Access (WiMAX) communication system that operates in accordance with the IEEE (Institute of Electrical and Electronics Engineers) 802.16 standards, including 802.16e and 802.16m.

In order to optimally allocate CCEs to control channels for UEs being scheduled for a DL or UL transmission, communication system 200 provides for aggregating CCEs to form a control channel based on a target CCE quality metric and for power-boosting the allocated CCEs based on unused CCEs, thereby reducing a number of CCEs that need to be aggregated to achieve a desired level of control channel performance.

Figure 6:
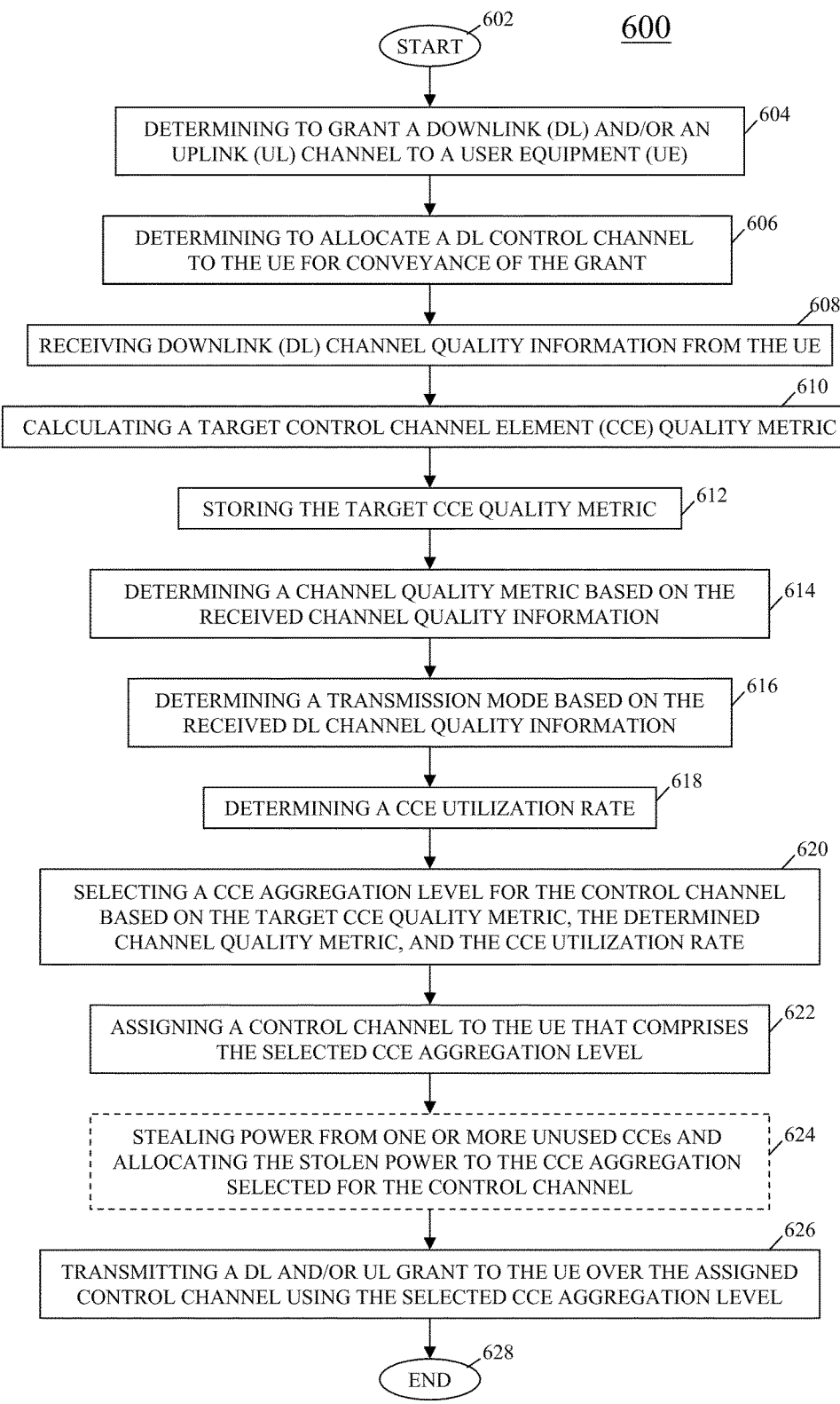
FIG. 6 is a logic flow diagram of a method performed by the communication system of FIG. 2 in scheduling a control channel in accordance with various embodiments of the present invention.

Referring now to FIG. 6, a logic flow diagram 600 is provided that depicts a method performed by communication system 200, and in particular by scheduler 224 of eNodeB 222, in scheduling a control channel for a UE for a scheduling interval, and in particular to allocating one or more CCEs to the control channel, in accordance with various embodiments of the present invention. Logic flow diagram 600 begins (602) when eNodeB 222 determines to grant (604) a DL channel and/or an UL channel to a UE serviced by the eNodeB, such as UE 201. This determination may be made in response to a request received from the UE, a received request that is intended for the UE, or for any other reason known in the art that would cause an eNodeB to grant a DL channel or an UL channel to a UE. In response to determining to grant a DL channel or UL channel to UE 201, eNodeB 222 determines (606) to allocate a DL control channel, preferably a Physical Downlink Control Channel (PDCCH), to the UE for conveyance of the grant, which DL control channel comprises one or more CCEs to be allocated to the control channel by the eNodeB. While the DL control channel also is referred to herein as a PDCCH, one of ordinary skill in the art realizes that the present invention encompasses any DL control channel that may be used to transmit a DL grant and/or an UL grant to a UE.

At some point in time that may be before or after the determination to grant the DL channel and/or UL channel to UE 201, UE 201 transmits to eNodeB 222, and the eNodeB receives (608) from the UE, DL channel quality information. Preferably, the DL channel quality information comprises Channel Quality Information (CQI) that is provided by a UE based on measurements of DL signals, such as pilot signals, transmitted by the eNodeB. That is, UE 201 measures a signal quality parameter associated with a DL signal received from the eNodeB during a measuring period, such as a sub-frame, and then reports back to eNodeB 222 a channel quality metric for the one or more channel elements of the frequency bandwidth employed by communication system 200 and that is based on the measured signal quality parameters. For example, the UE report may be a Channel Quality Information (CQI) message as known in the art. However, one of ordinary skill in the art realizes that many signal quality parameters may be measured to determine channel quality, for example, a received signal power, a signal-to-noise ratio, a carrier-to-interference ratio, or a carrier power-to-noise power ratio associated with a signals transmitted over one or more sub-bands, or may measure a bit error rate or a frame error rate associated with such a signal, and any such parameters may be used herein without departing from the spirit and scope of the present invention.

eNodeB 222 also calculates (610), and stores (612) in at least one memory device 404, a target CCE quality metric, preferably a target CCE signal-to-noise ratio (SNR), for each possible PDCCH format. That is, eNodeB 222 calculates a target CCE quality metric for each possible combination of PDCCH formats (for example, MPRs (Modulation order Product Code Rates)) and CCE aggregation levels for the PDCCH, that is, numbers of CCEs that may be aggregated to form the PDCCH. For example, a target CCE quality metric may be determined for each potential MPR and for each of the PDCCH's four possible CCE aggregation levels (that is, 1, 2, 4, and 8 CCEs). Preferably, eNodeB 222 calculates the target CCE quality metric by use of the following equation that is maintained in the at least one memory device 404 of the eNodeB, $$SNR_{CCE} = 10 \times \log_{10}\left[\frac{1}{MPR_B}\left(2^{\left(\frac{MPR_{PDCCH}}{MPR_A}\right)} - 1\right)\right] + SNR_{PDCCH\_offset}(dB)$$

where $SNR_{CCE}$ is the target CCE quality metric (wherein the quality metric is SNR, in decibels (dB)) $MPR_{PDCCH}$ is a Modulation order Product Code Rate (Modulation order× Code Rate) of the control channel, that is, the PDCCH, $MPR_A$ and $MPR_B$ are constants (in linear scale), and $SNR_{PDCCH\_offset}$ is an empirically determined adjustment factor that is used to adjust the algorithm based on PDCCH performance requirements and observed performance. For example, due to a variety of transmission factors such as interference, fading, and anything else that may effect a quality of a signal transmitted over the air, the observed system performance, such as PDCCH throughput or error rates, resulting from use of a target CCE quality metric, that is, SNR, may provide unacceptable performance absent application of the adjustment factor. In such an instance, the adjustment factor then would be used to increase the target CCE SNR in order to improve performance. In a 20 MHz (Megahertz) bandwidth OFDM communication system, preferably $MPR_A$=0.95 and $MPR_B$=0.75. However, the values assigned to $MPR_A$ and $MPR_B$ are up to a designer of communication system 200 and one of ordinary skill in the art realizes that other values may be assigned to $MPR_A$ and $MPR_B$ based considerations such as a desired level of acceptable channel quality, a desired level of system usage, system capacity, and other system performance factors.

eNodeB 222 may calculate and store the target CCE quality metric at any time prior to scheduling the control channel, that is, the PDCCH, for the UE. For example, the eNodeB 222 may calculate and store the target CCE quality metric at start up of the eNodeB, in response to receiving a channel quality measurement from the UE, at initiation of the process of assigning CCEs to the PDCCH for the UE, or at any other time that may occur to one of ordinary skill in the art so long as the target CCE quality metric is available to the eNodeB when selecting a CCE aggregation level for the for the PDCCH associated with the UE.

Based on the DL channel quality information received from the UE, that is, UE 201, eNodeB 222 determines (614) a channel quality metric, for example, an SNR, associated with the channel quality information received from that UE, and determines (616) a transmission mode, for example, one or more of a modulation scheme, a coding rate, and a bit repetition rate, that will be employed to transmit the PDCCH to the UE in the next scheduling period. For example, as is known in the art, when a UE reports back a CQI value, each reported CQI value maps to an SNR value, such as a reported CQI value equal to 3 corresponding to an SNR of −2 dB, and further maps to a transmission mode, such as a modulation scheme, coding rate, and repetition rate. In one such embodiment of the present invention, eNodeB may calculate the CCE quality metric associated with the channel quality information received from that UE and with each of one or more transmission modes by reference to one or more tables maintained in the at least one memory device 404 of the eNode B, which one or more tables map the reported channel quality information (for example, a CQI value) to a channel quality metric (for example, an SNR) and to a transmission mode. Such tables are well-known in the art and an exemplary CQI/transmission mode table 700 is depicted in FIG. 7. In another such embodiment of the present invention, eNodeB may calculate a CCE quality metric and a transmission mode associated with the channel quality information received from that UE by reference to one or more algorithms maintained in the at least one memory device 404 of the eNodeB, which one or more algorithms output a channel quality metric (for example, an SNR) and a transmission mode in response to an input of the reported channel quality information (for example, a CQI value).

eNodeB 222 also determines (618) a CCE utilization rate that is associated with an anticipated CCE utilization in a next scheduling period, for example, a sub-frame, and that is used to adjust a CCE aggregation level that will be utilized for the PDCCH associated with the UE in the next scheduling period. Preferably, the CCE utilization rate is in the same units as the target CCE quality metric and the determined channel quality metric and is based on a past CCE utilization, that is, a past rate of utilization of CCEs. For example, the CCE utilization rate may be based on a number of CCEs and/or a percentage of CCEs allocated to control channels, such as PDCCHs associated with UEs 201-204, by the eNodeB for PDCCH transmissions in each of one or more past scheduling periods, or sub-frames. Alternatively, the CCE utilization rate may be based on a number of CCEs and/or a percentage of CCEs that remained unused in each of one or more past scheduling periods/sub-frames. When the CCE utilization rate is based on a number or percentage of CCEs allocated to PDCCHs (or remaining unused) in each of multiple, for example, 'N', past scheduling periods/sub-frames, then the CCE utilization rate may be based on an average of the number or percentage of CCEs allocated to PDCCHs (or remaining unused) in the 'N' past scheduling periods/sub-frames.

The determined CCE utilization rate is based on an anticipated received CCE quality improvement resulting from boosting a transmit power level, that is, applying a power boosting offset, of one or more allocated CCEs by stealing power from one or more unused CCEs in the next scheduling period. For example, if only one-half (½) of the available CCEs are, on average, assigned to control channels in each of multiple past scheduling periods, then the power boosting offset based on CCE utilization rate may have a value of 2 dB. And if 80% of the available CCEs are, on average, assigned to control channels in each of multiple in past scheduling periods, then the power boosting offset based on CCE utilization rate may have a value of 0.5 dB.

eNodeB 222 then selects (620) a CCE aggregation level for the PDCCH that will be assigned to UE 201 for the next scheduling period based on the target CCE quality metric, the determined channel quality metric, and the offset based on CCE utilization rate and assigns a PDCCH, comprising the selected. For example, eNodeB 222 may select the smallest CCE aggregation level that complies with the following algorithm, which is maintained in the at least one memory device 404 of the eNodeB:

'determined channel quality metric'−'target CCE quality metric'+offset based on CCE utilization parameter>0, or, when the quality metrics are SNRs, $SNR_{based\_on\_reported\_CQI} - SNR_{CCE} +$ offset based on CCE utilization rate>0, wherein '$SNR_{based\_on\_reported\_CQI}$' is the SNR determined at step 614 above. eNodeB 222 then assigns (622) a PDCCH to UE 201 that comprises a plurality of control channel elements corresponding, in quantity, to the control channel element aggregation level selected for the PDCCH and transmits (626) a DL and/or UL grant to the UE over the assigned PDCCH. Logic flow 600 then ends (628).

eNodeB 222 further may steal (624) power from one or more unused CCEs and reallocate such power, that is, apply a power boosting offset, to one or more CCE elements of the PDCCH assigned to UE 201. That is, as is known in the art, only a limited total DL transmit power is available for allocation to CCEs. Typically, such power is allocated equally among all CCEs, whether the CCEs are used or unused during a scheduling period. eNodeB 222, instead, allocates a lower power level to one or more unused CCEs and reallocates the freed up power to one or more allocated aggregations of CCEs. By boosting the power of the one or more CCE aggregations, those CCE aggregations can provide a desired level of performance, such as a desired Quality of Service (QoS), with a fewer number of CCEs than would have been required had power been allocated equally among all CCEs, whether used or unused. The amount of power stolen and reallocated is, in turn, based on the channel quality information reported by the UE and on estimates, by the eNodeB and in accordance with know techniques in the art, of levels of performance that will be achieved by transmitting a channel element at various power levels based on the reported channel quality information and the transmission parameters employed.

Thus, use of the CCE utilization rate facilitates an assigning of a lower aggregation level, that is, a reduced number of CCEs, to the control channel than otherwise would be assigned in order to achieve the target CCE quality metric. That is, by permitting power to be stolen from unused CCEs and applied to allocated CCEs, communication system 200 provides for a desired level of performance to be achieved by a control channel by use fewer CCEs than would be required without such power-stealing. In turn, by reducing the CCE aggregation level for one or more DL control channels, fewer CCEs may be consumed in a given scheduling period by a given number of control channels than in the prior art, and CCEs are freed up for control channel allocation to otherwise blocked UEs.

Figure 8:
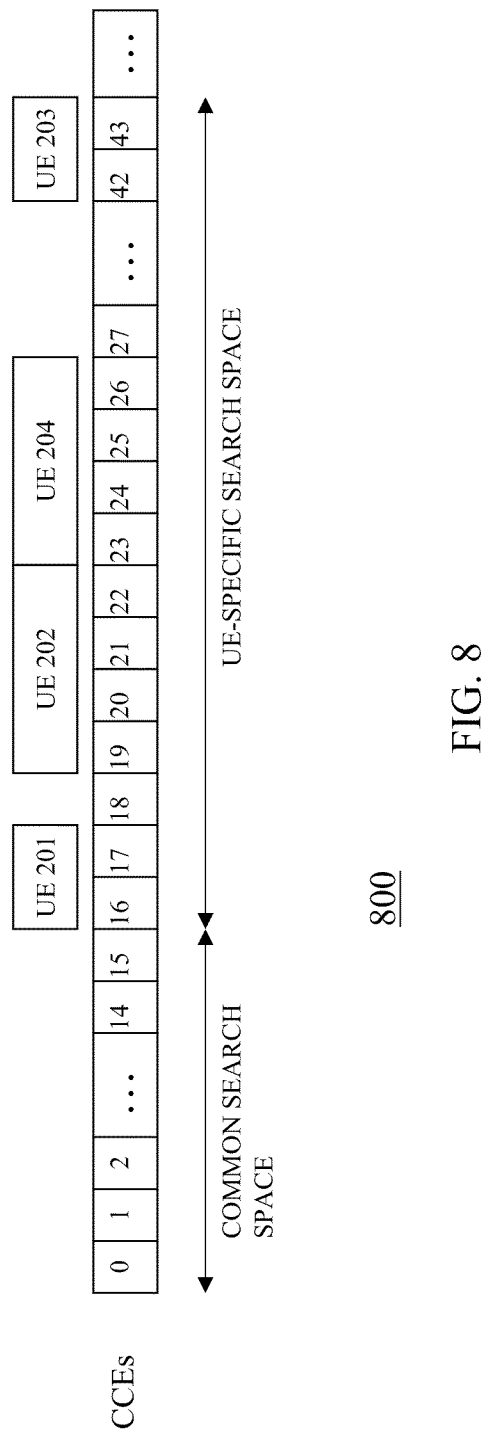
FIG. 8 is a block diagram illustrating an exemplary allocation of logical Control Channel Elements (CCEs) to users equipment (UEs) of the communication system of FIG. 2 served by an eNode B of the communication system of FIG. 2.

For example, and referring now to FIG. 8, a block diagram 800 is provided that illustrates an exemplary allocation of CCEs to UEs 201-204 by eNodeB 222. Assuming that the same channel conditions are reported by each of UEs 201-204 as were respectively reported by UEs 101-104 of FIG. 1, eNodeB 222 nevertheless is able to allocate a DL control channel to each of UEs 201-204, whereas in FIG. 1 UE 102 was blocked. That is, in FIG. 8, UE 201 is allocated CCEs 16-17, UE 202 is allocated CCEs 19-22, UE 204 is allocated CCEs 23-26, and UE 203 is allocated CCEs 42-43. UE 201 is allocated only two CCEs by eNodeB 222, as opposed to UE 101 being allocated four CCEs, as power from one or more unused CCEs in FIG. 8, for example, CCE 27, is stolen to boost the power of the CCEs allocated to UE 201. This power-stealing is reflected in the CCE utilization rate employed by eNodeB 222 when determining a CCE aggregation level for a control channel allocation for UE 201, resulting in an assignment of a CCE aggregation level of two, as opposed to four, to the control channel. Thus acceptable performance is achieved by UE 201 despite being allocated two less CCEs than UE 101, latency is reduced for data transfers to and from UE 202 (as opposed to UE 102), overall system throughput is improved, and overall system capacity is conserved.

While the present invention has been particularly shown and described with reference to particular embodiments thereof, it will be understood by those skilled in the art that various changes may be made and equivalents substituted for elements thereof without departing from the scope of the invention as set forth in the claims below. Accordingly, the specification and figures are to be regarded in an illustrative rather then a restrictive sense, and all such changes and substitutions are intended to be included within the scope of the present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any variation thereof, are intended to cover a non-exclusive inclusion, such that a process, method, article, or apparatus that comprises a list of elements does not include only those elements but may include other elements not expressly listed or inherent to such process, method, article, or apparatus. Furthermore, unless otherwise indicated herein, the use of relational terms, if any, such as first and second, top and bottom, and the like are used solely to distinguish one entity or action from another entity or action without necessarily requiring or implying any actual such relationship or order between such entities or actions.

What is claimed is:

1. A method for scheduling a control channel for a user equipment in an Orthogonal Frequency Division Multiplexing communication system, the method comprising:
   determining a channel quality metric associated with the user equipment;
   calculating a target control channel element quality metric;

determining a control channel element utilization rate, wherein the control channel element utilization rate corresponds to a past rate of utilization of control channel elements; and selecting a control channel element aggregation level for the control channel based on the channel quality metric, the target control channel element quality metric, and the control channel element utilization rate.

2. The method of claim 1, wherein calculating a target control channel element quality metric comprises applying an adjustment factor to a calculated target control channel element quality metric.

3. The method of claim 1, wherein the target control channel element quality metric and the determined channel quality metric each comprises a signal-to-noise ratio.

4. The method of claim 1, further comprising:
assigning the control channel to the user equipment, wherein the assigned control channel comprises a plurality of control channel elements corresponding, in quantity, to the control channel element aggregation level selected for the control channel; and
transmitting one or more of a downlink grant and an uplink grant to the user equipment over the assigned control channel.

5. The method of claim 1, further comprising stealing power from one or more unused control channel elements and assigning the stolen power to one or more of the plurality of control channel elements assigned to the control channel.

6. The method of claim 1, wherein the target control channel element quality metric comprises a signal-to-noise ratio and wherein the target control channel element quality metric is calculated by use of the following equation:

$$SNR_{CCE} = 10 \times \log_{10}\left[\frac{1}{MPR_B}\left(2^{\left(\frac{MPR_{PDCCH}}{MPR_A}\right)} - 1\right)\right] + SNR_{PDCCH\_offset}(\text{dB})$$

where $SNR_{CCE}$ is the target control channel element quality metric, $MPR_{PDCCH}$ is a Modulation order Product Code Rate for the control channel, $MPR_A$ and $MPR_B$ are constants, and $SNR_{PDCCH\_offset}$ is a control channel adjustment factor.

7. The method of claim 1, wherein the control channel element utilization rate is based on one or more of a number of control channel elements and a percentage of control channel elements allocated to control channels in each of one or more past scheduling periods.

8. The method of claim 1, wherein determining a control channel element utilization rate comprises calculating an average control channel element utilization over a plurality of past scheduling periods.

9. The method of claim 1, wherein the control channel is a Physical Downlink Control Channel.

10. A scheduler for scheduling a control channel for a user equipment in an Orthogonal Frequency Division Multiplexing communication system, the scheduler comprising a processor that is configured to:
determine a channel quality metric associated with the user equipment;
calculate a target control channel element quality metric;
determine a control channel element utilization rate, wherein the control channel element utilization rate corresponds to a past rate of utilization of control channel elements; and
select a control channel element aggregation level for the control channel based on the channel quality metric, the target control channel element quality metric, and the control channel element utilization rate.

11. The scheduler of claim 10, wherein the processor is configured to calculate a target control channel element quality metric by applying an adjustment factor to a calculated target control channel element quality metric.

12. The scheduler of claim 10, wherein the target control channel element quality metric and the determined channel quality metric each comprises a signal-to-noise ratio.

13. The scheduler of claim 10, wherein the processor is configured to:
assign the control channel to the user equipment, wherein the assigned control channel comprises a plurality of control channel elements corresponding, in quantity, to the control channel element aggregation level selected for the control channel; and
convey one or more of a downlink grant and an uplink grant to the user equipment over the assigned control channel.

14. The scheduler of claim 10, wherein the processor is configured to steal power from one or more unused control channel elements and assigning the stolen power to one or more of the plurality of control channel elements assigned to the control channel.

15. The scheduler of claim 10, wherein the scheduler further comprises an at least one memory device coupled to the processor, wherein the target control channel element quality metric comprises a signal-to-noise ratio, and wherein the processor is configured to calculate the target control channel element quality metric by use of the following equation that is maintained by the at least one memory device:

$$SNR_{CCE} = 10 \times \log_{10}\left[\frac{1}{MPR_B}\left(2^{\left(\frac{MPR_{PDCCH}}{MPR_A}\right)} - 1\right)\right] + SNR_{PDCCH\_offset}(\text{dB})$$

where $SNR_{CCE}$ is the target control channel element quality metric, $MPR_{PDCCH}$ is a Modulation order Product Code Rate for the control channel, $MPR_A$ and $MPR_B$ are constants, and $SNR_{PDCCH\_offset}$ is a control channel adjustment factor.

16. The scheduler of claim 10, wherein the control channel element utilization rate is based on one or more of a number of control channel elements and a percentage of control channel elements allocated to control channels in each of one or more past scheduling periods.

17. The scheduler of claim 10, wherein the control channel is a Physical Downlink Control Channel.

18. An eNodeB comprising the scheduler of claim 10.

* * * * *